May 4, 1965

R. J. OLANDER 3,181,903

DOOR FASTENER

Filed June 18, 1962

INVENTOR.
Roland J. Olander
BY
Atty.

May 4, 1965    R. J. OLANDER    3,181,903
DOOR FASTENER

Filed June 18, 1962    4 Sheets-Sheet 3

INVENTOR.
Roland J. Olander
BY
Atty.

May 4, 1965    R. J. OLANDER    3,181,903
DOOR FASTENER

Filed June 18, 1962    4 Sheets-Sheet 4

INVENTOR.
Roland J. Olander
BY
Atty.

United States Patent Office 3,181,903
Patented May 4, 1965

3,181,903
DOOR FASTENER
Roland J. Olander, La Grange, Ill., assignor to W. H. Miner, Inc., Chicago, Ill., a corporation of Delaware
Filed June 18, 1962, Ser. No. 203,096
5 Claims. (Cl. 292—5)

My present invention relates generally to door fasteners and more particularly to door fasteners adapted for use with the doors of transport vehicles.

Transport vehicles or highway trailers having enclosed trailer bodies are usually provided at the rear end thereof with a pair of doors each of which has a vertical edge hinged to the sides of the rear frame of the trailer body. These doors are adapted to be swung within the plane of the rear frame of the trailer body with their free vertical edges being disposed in substantial abutting relation for closing the rear end of the trailer body.

As will be readily appreciated, suitable fastening means are required for selectively retaining the doors within the plane of the trailer body door frame. Conventionally, one of the doors carries stop or limit means along its vertical free edge which is engageable by the vertical free edge of the second door and which serves to prevent outward swinging movement of the first door when both doors are within the plane of the trailer body door frame. For the purpose of retaining the second door within the plane of the rear frame, it is common practice to mount slidable bolts on the second door and provide means for moving the bolts into and out of engagement with keeper means mounted on the upper and lower elements of the trailer body door frame.

Existing door fastening means of the character described have a number of disadvantages. First, such fastening means do not serve to resist outward bulging of the central portion of the second door caused by the pressure of shifting loads within the trailer body. Secondly, considerable difficulty is encountered in aligning the bolts with the keeper means as the doors are swung within the plane of the trailer body door frame. And, finally, the means for moving the bolts into and out of engagement with the keeper means are complicated in construction and operation.

It is an object of my present invention to provide a door fastener which is adapted to retain a pair of swinging doors within a door frame and which includes central locking means serving to resist outward bulging of the central part of one of the doors relative to the other when pressure is applied at the inside of the door.

It is another object of my present invention to provide a door fastener having top and bottom locking means comprising interlocking bolt and keeper means structurally arranged so that the doors may be quickly and easily located and aligned within the plane of the door frame while being closed and locked.

It is a further object of my present invention to provide toggle linkage means for effecting substantially simultaneous actuation of the top, bottom and central locking means.

In accomplishing the aforementioned objects, I provide door fastening means comprising a pair of guide members carried on one of the doors at the top and bottom thereof with each of the guide members having a vertical opening therein. Mounted on the upper and lower elements of the door frame are first keeper means with vertical openings therein which are of a smaller cross sectional area than the cross sectional area of the openings in the guide members and which are substantially aligned with the latter when the door lies in the plane of the frame. Bolt means are slidable in the guide members and each has a first body portion generally conforming to the cross section of the openings in the first keeper means and a second enlarged body portion generally conforming to the cross section of the openings in the guide members. Toggle linkage means, operable during closing of the doors, is interconnected with the bolt means for initially moving the first body portions of the latter into the openings in the first keeper means thereby serving to locate the door within the general plane of the frame and then moving the second body portions into the openings in the guide members thereby serving to force and to hold the door tightly within the plane of the frame. Second keeper means is mounted on the second door and the toggle linkage means has latch means adapted to be positioned in locking engagement with the second keeper means as the bolt means is moved into locking engagement with the first keeper means. In accordance with this construction, the bolt means when in engagement with the first keeper means serves to retain the top and bottom of the first door within the plane of the door frame, and the latch means when in engagement with the second keeper means serves to retain the central parts of the two doors together within the plane of the door frame. In addition, the toggle linkage means serves to actuate substantially simultaneously the top and bottom bolt means and the central latch means thus providing an easily operated and inexpensive door fastening means.

Now in order to acquaint those skilled in the art with the manner of constructing and utilizing devices in accordance with the principles of my present invention, I shall describe in connection with the accompanying drawings, a preferred embodiment of my invention.

Figures 1, 7:
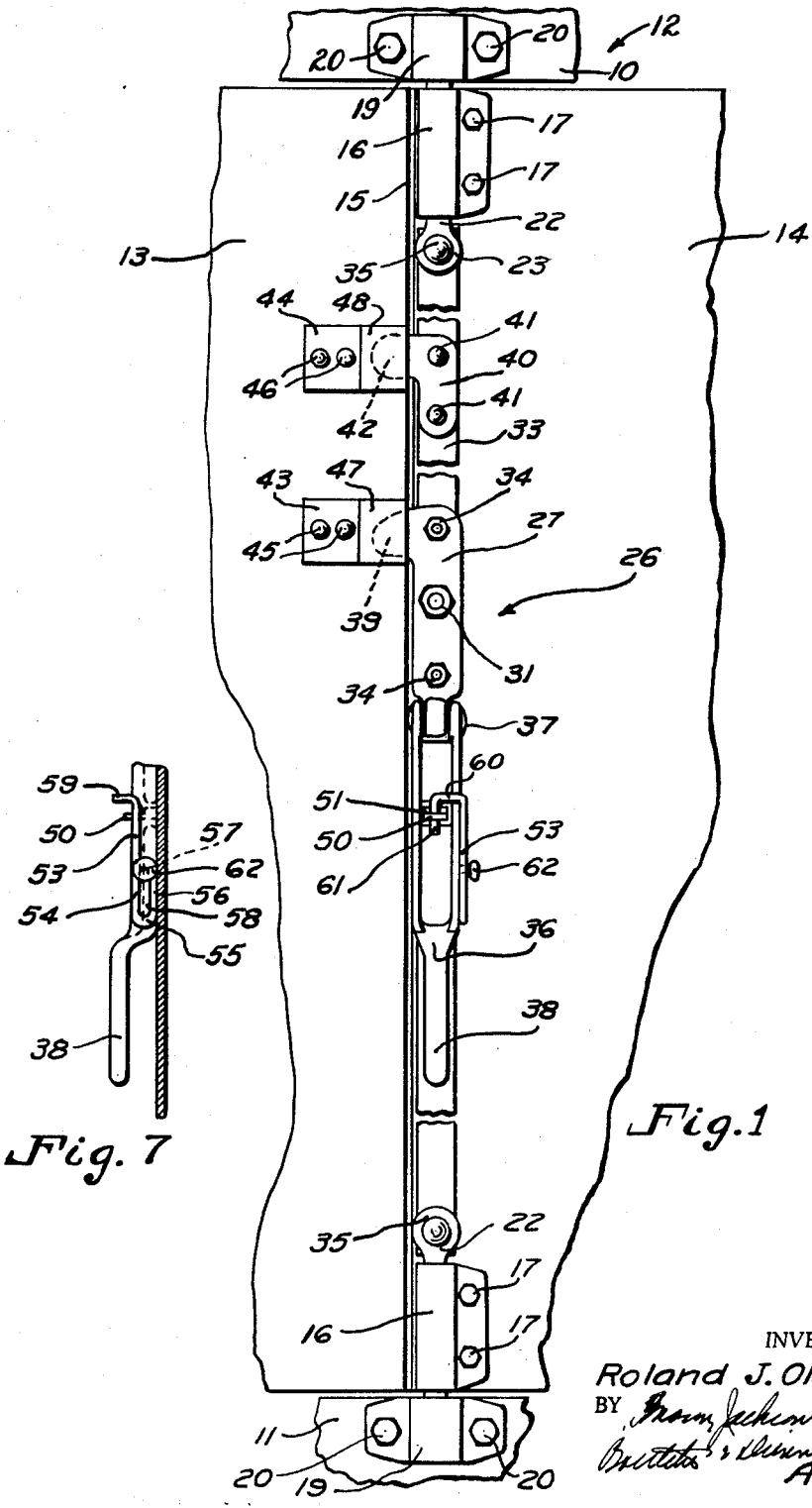
FIGURE 1 is a fragmentary elevational view of a door frame and a pair of doors with which the door fastener of my present invention has been incorporated and in which the elements of the latter are shown in a locked or closed position.
FIGURE 7 is a side elevational view of the handle latch means shown in FIGURE 1.

Referring now to FIGURE 1, there are shown fragmentary portions 10 and 11 of the upper and lower horizontal structural elements, respectively, of a conventional door frame, indicated generally by the reference numeral 12, which may, for example, be located at the rear end of the body of an enclosed transport vehicle. Suitably hinged along their one vertical edges to the vertical sides (not shown) of the door frame 12 are a pair of doors 13 and 14 which are arranged to be swung into the plane of the door frame 12 with their free vertical edges being disposed in substantial abutting relation for closing the opening defined by the frame 12. Secured to the rear face of the door 13 and projecting therefrom along the vertical free edge thereof is a stop or limit strip 15 which is engageable by the vertical free edge of the door 14 for preventing outward swinging movement of the door 13 when the doors 13 and 14 are within the plane of the door frame 12.

The door fastener means of my present invention, which is adapted to operatively interconnect the doors 13 and 14 and the structural elements 10 and 11 for retaining the doors 13 and 14 within the plane of the door frame 12, includes top, bottom and center locking means.

Figure 6:
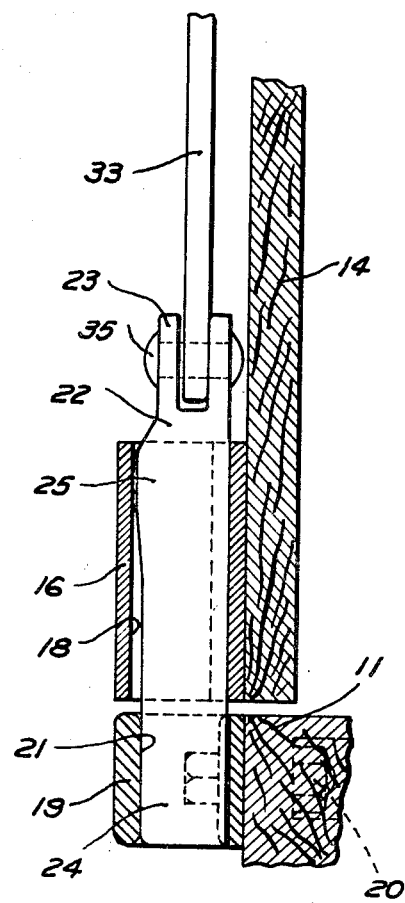
FIGURE 6 is a median vertical sectional view of the portion of the door fastener shown in FIGURE 5.

The top and bottom locking means comprises a pair of vertical guide members 16 mounted, as by bolts 17, on the door 14 one each adjacent the top and bottom corners thereof. Each of the guide members 16, as shown in FIGURE 6, has a vertical opening 18 therein which is preferably rectangular in cross section. A pair of keeper members 19, shown for example in FIGURE 1, are mounted, as by bolts 20, one each on the upper and lower structural elements 10 and 11 adjacent the upper and lower ends of the guide members 16. Each of the keeper members 19, as shown in FIGURE 6, has a vertical opening 21 therein which is preferably rectangular with a cross sectional area smaller than the cross sectional area of the openings 18 in the guide members 16. The keeper members 19 are arranged so that the axes of the openings 21 therein substantially align with the axes of the openings 18 in the guide members 16 when the door 14 lies in the plane of the door frame 12. Slidably mounted in each of the guide members 16 and receivable in the adjacent keeper member 19 is a bolt member 22 formed with a yoke 23 at its inner end. Each bolt member 22 has a first body portion 24 generally conforming to the cross section of the openings 21 in the keeper members 19 and a second enlarged body portion 25 generally conforming to the cross section of the openings 18 in the guide members 16.

Figure 2:
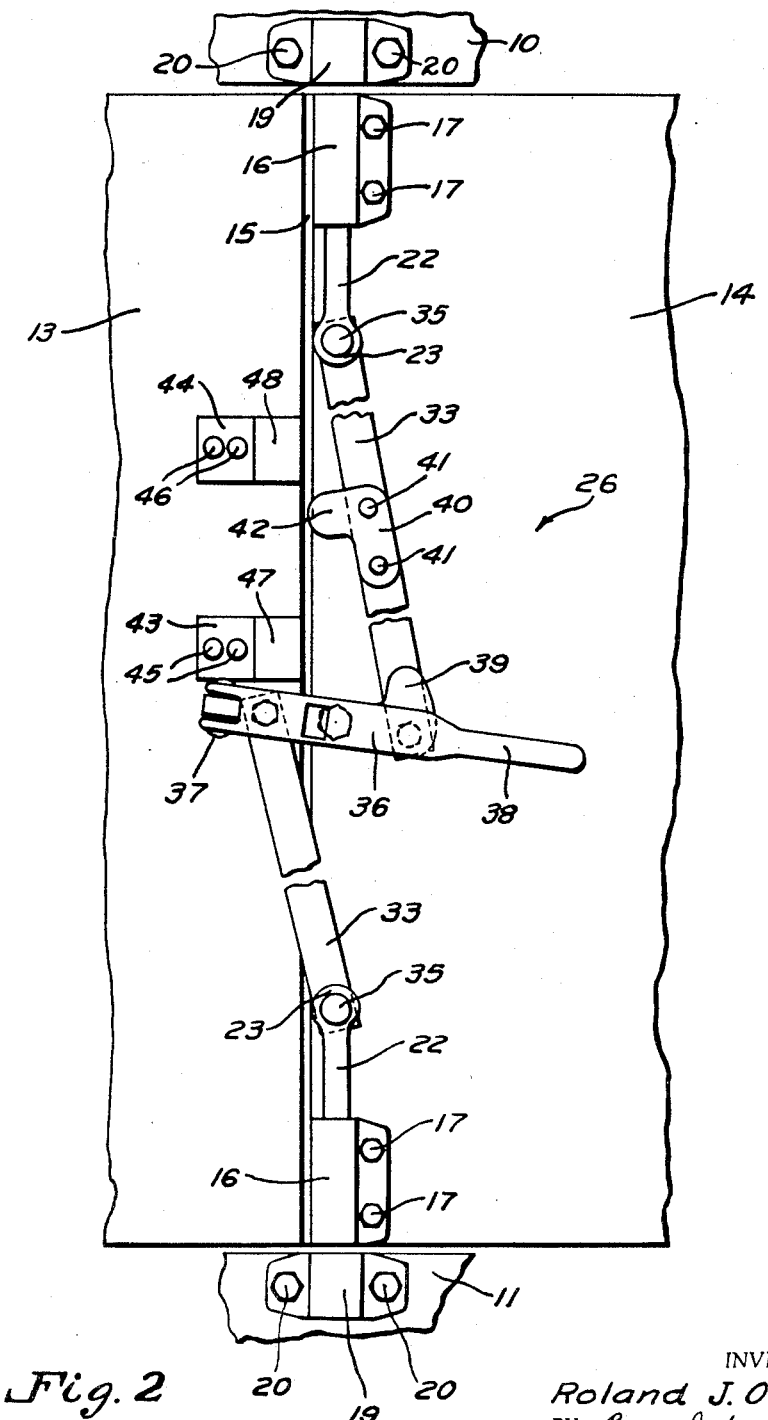
FIGURE 2 is an elevational view similar to FIGURE 1 showing the elements of the door fastener in an unlocked or open position.
Figure 3:
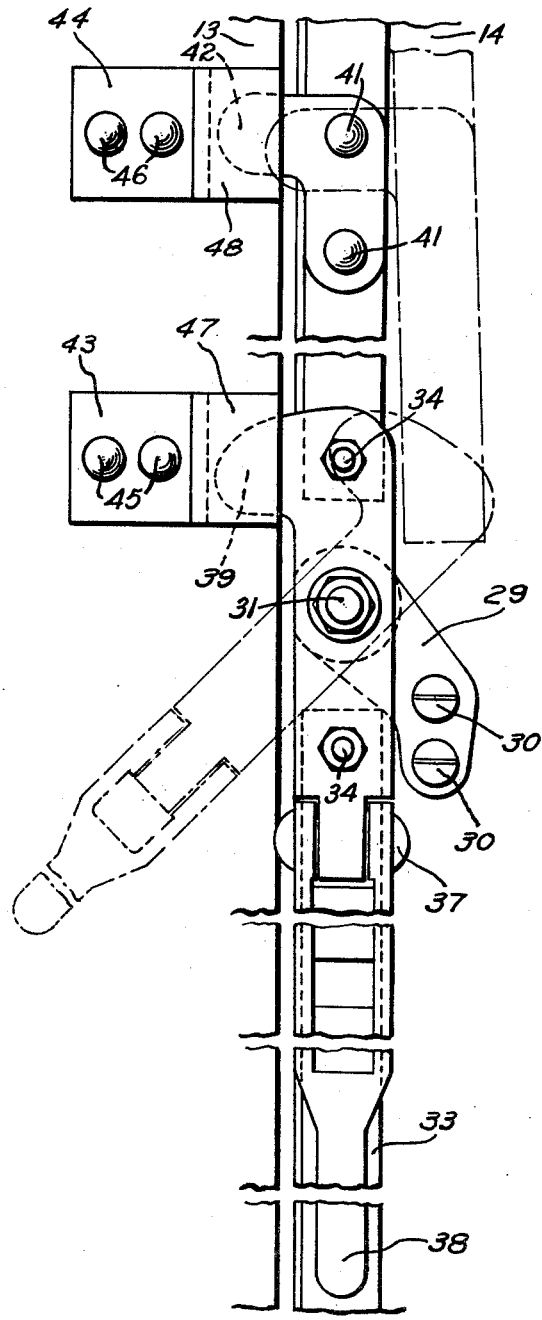
FIGURE 3 is an enlarged elevational view of the central portion of the door fastener of FIGURE 1.
Figure 4:
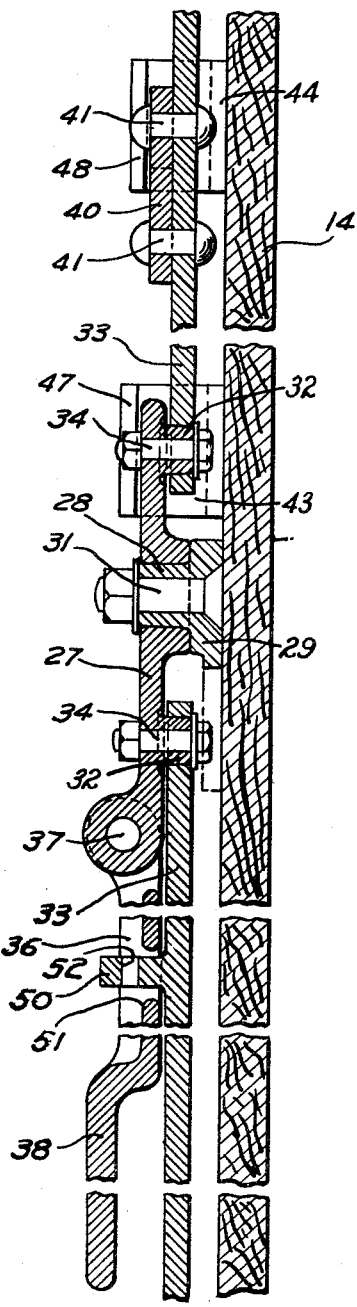
FIGURE 4 is a median vertical sectional view of the portion of the door fastener shown in FIGURE 3.
Figure 5:
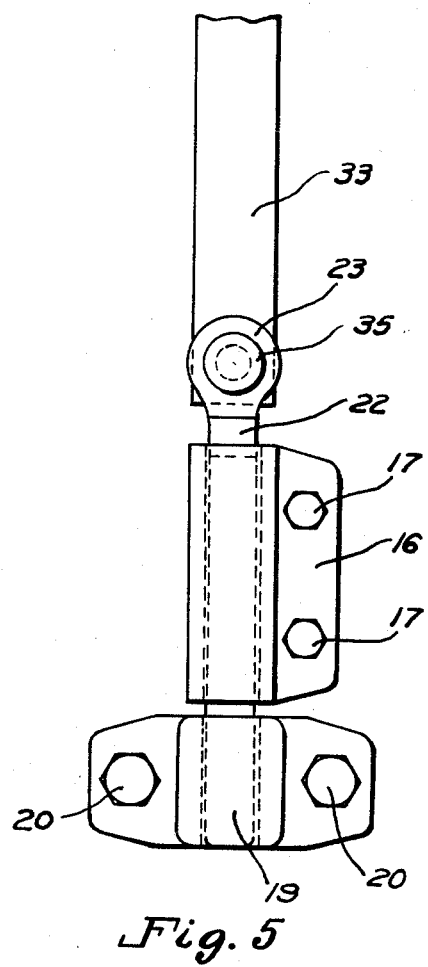
FIGURE 5 is an enlarged elevational view of the lower portion of the door fastener of FIGURE 1.

The bolt members 22 are adapted to be moved axially into and out of engagement with the keeper members 19 by means of toggle linkage means shown for example in FIGURES 1 and 2 and indicated generally by the reference numeral 26. The toggle linkage means 26 comprises a toggle lever 27 pivotally mounted intermediate of its ends, as shown in FIGURES 3 and 4, on the horizontal boss portion 128 of a bearing plate 29 secured, as by bolts 30, to the central portion of the door 14 adjacent the vertical free edge thereof. The toggle lever 27 is retained on the boss 28 by means of a bolt and washer assembly 31.

The ends of the toggle lever 27 are formed with lateral boss portions 32 upon which are pivotally mounted the adjacent ends of upper and lower toggle bars 33 retained in position by bolt and washer assemblies 34. The opposite ends of the toggle bars 33, as shown in FIGURES 1, 2, 5 and 6, are one each pivotally connected, as by rivets 35, within each of the yokes 23 of the bolt members 22. A crank arm or handle 36 at its one end is pivotally connected, as by a rivet member 37, to the lower end of the toggle lever 27 as viewed in FIGURES 1 and 4, and at its other end is formed with an offset hand-grip 38.

Central locking means is also associated with the toggle linkage means 26. As shown in FIGURE 1, the upper end of the toggle lever 27 is provided with latch means in the form of a lateral projection 39 having a generally arcuate nose portion. In a related manner, a plate member 40 is secured, as by rivet assemblies 41, to the upper toggle bar 33 and is provided with latch means in the form of a lateral projection 42 having a generally arcuate nose portion. A pair of keeper members 43 and 44 are secured, respectively, as by rivets 45 and 46, to the door 13 adjacent its vertical free edge intermediate of the top and bottom thereof. The keeper members 43 and 44, respectively, have forward offset wall portions 47 and 48 that are parallel to and spaced from the plane of the door 13, and the lateral latch projections 39 and 42 are receivable, respectively, between the offset walls 47 and 48 and the door 13.

As shown in FIGURE 4, the lower toggle bar 33 has secured thereto a projection 50 which is arranged to extend forwardly through an opening 51 formed in the handle 36 when the latter is in a downwardly extending position. The projection 50 has an aperture 52 therein which is adapted to cooperate with a latch member 53 shown in FIGURES 1 and 7. The latch member 53 is preferably formed of rod stock and comprises a vertical body portion 54 which, at its lower end, is bent rearwardly at 55, upwardly at 56, and forwardly at 57 to define an oblong opening 58. The upper end of the body portion 54 is bent forwardly at 59, laterally at 60, and downwardly at 61 to define a depending free end. The latch member 53 is slidably mounted along the side of the handle 36 by means of a fastener pin 62 which extends through the oblong opening 58. The pin 62 at its inner end is suitably secured in the side of the handle 36 and at its outer end is formed with an enlarged head portion. With the latch member 53 in the position shown in FIGURES 1 and 7, the free end 61 thereof extends downwardly through the aperture 52 in the projection 50 and thus serves to secure the handle 36 in its downwardly extending position. The handle 36 may be released by moving the latch member 53 upwardly so as to move the free end 61 thereof out of engagement with the aperture 52 in the projection 50. During sliding movement of the latch member 53, the latter is guided on the pin member 62.

The elements of the door fastener of my present invention are shown in an unlocked or open position in FIGURE 2. After the doors 13 and 14 have been swung generally within the plane of the door frame 12 with the limit strip 15 lying behind the door 14, the hand grip 38 may be grasped by an operator and the handle 36 swung from the position shown in FIGURE 2 where it lies alongside the toggle lever 27 to a position where it is in substantial lengthwise alignment with the toggle lever 27. Then the handle 36 may be swung downwardly for causing counterclockwise rotation of the toggle lever 27 about its pivotal axis 31. As the toggle lever 27 pivots in a counterclockwise direction, the upper and lower toggle bars 33, respectively, are urged upwardly and downwardly for moving the bolt members 22 into locking engagement with the keeper members 19. Initially, the first body portions 24 of the bolt members 22 are moved into engagement with the openings 21 in the keeper members 19 thereby serving to locate and align the door 14 within the general plane of the door frame 12, and then the second body portions 25 of the bolt members 22 are moved into engagement with the openings 18 in the guide members 16 thereby serving to force and to hold the top and bottom of the door 14 tightly within the plane of the door frame 12.

As the bolt members 22 are moved into locking engagement with the keeper members 19, the toggle lever 27 and toggle bars 33 shift from the positions shown in FIGURE 2 to the positions shown in FIGURE 1. During this movement of the toggle lever 27 and toggle bars 33, the lateral latch projections 39 and 42, respectively, are disposed into position between the door 13 and the offset walls 47 and 48 of the keeper members 43 and 44, with the projections 39 and 42 straddling the adjacent edges of the doors 13 and 14. When the lateral latch projections 39 and 42 are in locking engagement with the keeper members 43 and 44, the latter serve to retain the intermediate parts of the doors 13 and 14 together within the plane of the frame and to resist outward bulging thereof when pressure is applied at the inside of the doors, for example, as the result of shifting loads within the trailer body. By arranging the toggle linkage means 26 to actuate both the bolt members 22 and the lateral latch projections 39 and 42, it will be realized that I have provided a door fastener that is relatively simple in construction and easy to operate. It will be further understood by those skilled in the art that the number of latch projections and associated keeper members may be varied in accordance with conditions of operation. After the door fastening means has been placed in a locked position, the latch member 53 is moved toward the pivotal axis of the handle 36 and the latter is pivoted to a downwardly extending position with the projection 50 extending through the opening 51 therein. Then the latch member 53 is permitted to move downwardly so as to dispose the free end 61 thereof through the aperture 52 in the projection 50.

To release the door fastening means of my present invention, the latch member 53 is first moved upwardly so as to withdraw the free end 61 from the aperture 52. Then the handle 36 is swung in a clockwise direction whereby the toggle lever 27 is pivoted in a corresponding direction about its axis 31 and the upper and lower toggle bars 33 are drawn, respectively, downwardly and upwardly. During this movement of the toggle bars 33, the bolt members 22 are withdrawn from engagement with the keeper members 19 and the lateral projections 39 and 42 are withdrawn from engagement with the keeper members 43 and 44. In a fully unlocked position, the handle 36 is folded alongside of the toggle lever 27 and the elements of my door fastener will assume the positions shown in FIGURE 2. In this unlocked or open position, the downward force component of the weight of the upper portion of the fastener mechanism acting to the right of pivot 31 is greater than the downward force component of the weight of the lower portion of the fastener mechanism acting to the left of pivot 31; this relationship tends to maintain the door fastener in open position.

While I have shown and described what I consider to be a preferred embodiment of my present invention, it will be understood that various modifications and rearrangements may be made therein without departing from the spirit and scope of my invention.

I claim:

1. For use with a door frame having upper and lower elements and first and second doors each having a vertical edge hinged to the frame, the combination of vertically movable bolt means carried on the first door one each at the top and bottom thereof, first keeper means mounted on the upper and lower elements of the frame and adapted to receive said bolt means, a toggle lever pivotally mounted intermediate of its ends to the first door, toggle bars connected at their one ends to the ends of said toggle lever and connected at their other ends so said bolt means, said toggle lever upon pivotal movement being adapted to move said toggle bars whereby said bolt means are moved into and out of engagement with said first keeper means, said bolt means when in locking engagement with said first keeper means serving to retain the top and bottom of the first door within the plane of the frame, second and third keeper means mounted on the second door intermediate of the top and bottom thereof, said second and third keeper means each having a wall parallel to and spaced from the plane of the second door, said toggle lever having a lateral projection at one end thereof, at least one of said toggle bars having a lateral projection intermediate of the ends thereof, said lateral projections of said toggle lever and said toggle bar being adapted to be swung into and out of locking engagement with said second and third keeper means intermediate said walls of said second and third keeper means and the second door as said bolt means is moved into and out of locking engagement with said first keeper means, and said lateral projections when in locking engagement with said second and third keeper means serving to retain the intermediate parts of the first and second doors together within the plane of the frame.

2. For use with a door frame having upper and lower elements and first and second doors each having a vertical edge hinged to the frame, the combination of guide members carried on the first door one each at the top and bottom thereof, each of said guide members having a vertical opening therein, first keeper means mounted on the upper and lower elements of the frame, said first keeper means having vertical openings therein substantially aligned with said openings in said guide members when the first door lies in the plane of the frame, the cross sectional area of said openings in said guide members being greater than the cross sectional area of said openings in said first keeper means, bolt means slidable in said guide means and each having a first body portion generally conforming to the cross section of said openings in said first keeper means and a second enlarged body portion generally conforming to the cross section of said openings in said guide means, toggle linkage means interconnecting said bolt means for initially moving said first body portions of the latter into said openings in said first keeper means thereby serving to locate the first door within the general plane of the frame and then moving said second body portions into said openings in said guide members thereby serving to force and to hold the top and bottom of the first door tightly within the plane of the frame, second keeper means mounted on the second door intermediate of the top and bottom thereof, said toggle linkage means having lock means adapted to be positioned into and out of locking engagement with said second keeper means as said bolt means is moved into and out of locking engagement with said first keeper means, and said lock means when in locking engagement with said second keeper means serving to retain the intermediate parts of the first and second doors together within the plane of the frame.

3. For use with a door frame having upper and lower elements and first and second doors each having a vertical edge hinged to the frame, the combination of guide members carried on the first door one each at the top and bottom thereof, each of said guide members having a vertical opening therein, first keeper means mounted on the upper and lower elements of the frame, said first keeper means having vertical openings therein substantially aligned with said openings in said guide members when the first door lies in the plane of the frame, the cross sectional area of said openings in said guide members being greater than the cross sectional area of said openings in said first keeper means, bolt means slidable in said guide means and each having a first body portion generally conforming to the cross section of said openings in said first keeper means and a second enlarged body portion generally conforming to the cross section of said openings in said guide means, a toggle lever pivotally mounted to the first door, toggle bars connected at their one ends to the ends of said toggle lever and connected at their other ends to said bolt means, said toggle lever upon pivotal movement being adapted to initially move said first body portions of said bolt means into said openings in said first keeper means thereby serving to locate the first door within the general plane of the frame and then move said second body portions into said openings in said guide members thereby serving to force and to hold the top and bottom of the first door tightly within the plane of the frame, second keeper means mounted on the second door intermediate of the top and bottom thereof, said toggle lever having a lateral projection adapted to be swung into and out of locking engagement with said second keeper means as said bolt means is moved into and out of locking engagement with said first keeper means, and said lateral projection when in locking engagement with said second keeper means serving to retain the intermediate parts of the first and second doors together within the plane of the frame.

4. For use with a door frame having upper and lower elements and first and second doors each having a vertical edge hinged to the frame, the combination of first lock means carried on the first door at the top and bottom thereof, first keeper means mounted on the upper and lower elements of the frame and adapted to receive said first lock means, toggle linkage means interconnecting said first lock means for moving the latter into and out of locking engagement with said first keeper means, said first lock means when in locking engagement with said first keeper means serving to retain the top and bottom of the first door within the plane of the frame, second keeper means mounted on the second door intermediate of the top and bottom thereof, said toggle linkage means having second lock means adapted to be positioned into and out of locking engagement with said second keeper means as said first lock means is moved into and out of locking engagement with said first keeper means, said second lock means when in locking engagement with said second keeper means serving to retain the intermediate parts of the first and second doors together within the plane of the frame, a handle for actuating said toggle linkage means, said handle having an opening therein, a projection carried by said toggle linkage means, said projection being adapted to extend through said opening in said handle when the latter is in a downwardly extending position, said projection having an aperture therein, a latch member having a body portion with the lower part thereof arranged to define an oblong opening and with the upper part thereof having a free end, pin means extending through said oblong opening in said latch member for slidably mounting the latter to said handle, and said free end of said latch member being adapted to be selectively disposed through said aperture in said projection for securing said handle in a downwardly extending position.

5. For use with a door frame having upper and lower elements and first and second doors each having a vertical edge hinged to the frame, the combination of vertically movable bolt means carried on the first door one each at the top and bottom thereof, first keeper means mounted on the upper and lower elements of the frame and adapted to receive said bolt means, a toggle lever pivotally mounted to the first door, toggle bars connected at their one ends to the ends of said toggle lever and connected at their other ends to said bolt means, said toggle lever upon pivotal movement being adapted to move said bolt means into and out of engagement with said first keeper means, said bolt means when in locking engagement with said first keeper means serving to retain the top and bottom of the first door within the plane of the frame, second keeper means mounted on the second door intermediate of the top and bottom thereof, said second keeper means having a wall parallel to and spaced from the plane of the second door, said toggle lever having a lateral projection adapted to be swung into and out of locking engagement with said second keeper means intermediate said wall of said second keeper means and the second door as said bolt means is moved into and out of locking engagement with said first keeper means, said lateral projection when in locking engagement with said second keeper means serving to retain the intermediate parts of the first and second doors together within the plane of the frame, a handle pivotally mounted on said toggle lever for actuating the latter, said handle having an opening therein, a projection carried by one of said toggle bars, said projection being adapted to extend through said opening in said handle when the latter is in a downwardly extending position, said projection having an aperture therein, a latch member formed of rod stock and having a body portion with the lower part thereof arranged to define an oblong opening and with the upper part thereof having a free end, pin means extending through said oblong opening in said latch member for slidably mounting the latter to said handle, and said free end of said latch member being adapted to be selectively disposed through said aperture in said projection for securing said handle in a downwardly extending position.

References Cited by the Examiner

UNITED STATES PATENTS

| | | | |
|---|---|---|---|
| 605,880 | 6/98 | Kirby | 292—7 |
| 815,466 | 3/06 | Phillips | 292—7 |
| 1,438,233 | 12/22 | Hammann. | |
| 1,626,834 | 5/27 | Hull | 292—5 |

FOREIGN PATENTS

| | | |
|---|---|---|
| 256,064 | 8/26 | Great Britain. |
| 703,120 | 1/54 | Great Britain. |

M. HENSON WOOD, Jr., *Primary Examiner.*